(12) United States Patent
Allen et al.

(10) Patent No.: US 10,559,879 B2
(45) Date of Patent: Feb. 11, 2020

(54) PHASED ARRAY BURST SAMPLER

(71) Applicant: Anokiwave, Inc., San Diego, CA (US)

(72) Inventors: Wade Allen, San Diego, CA (US); Robert McMorrow, San Diego, CA (US); David Corman, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 782 days.

(21) Appl. No.: 15/212,813

(22) Filed: Jul. 18, 2016

(65) Prior Publication Data

US 2018/0019517 A1 Jan. 18, 2018

(51) Int. Cl.
*H01Q 3/26* (2006.01)
*G01S 13/06* (2006.01)
*H01Q 3/36* (2006.01)
*G01S 13/02* (2006.01)

(52) U.S. Cl.
CPC ........... *H01Q 3/2694* (2013.01); *G01S 13/06* (2013.01); *H01Q 3/36* (2013.01); *G01S 2013/0254* (2013.01)

(58) Field of Classification Search
CPC ................................ H04B 7/005; H01Q 21/00
See application file for complete search history.

(56) References Cited

U.S. PATENT DOCUMENTS

| | | | |
|---|---|---|---|
| 5,448,250 A | 9/1995 | Day | 343/700 MS |
| 5,920,278 A | 7/1999 | Tyler et al. | |
| 6,266,528 B1 | 7/2001 | Farzaneh | |
| 7,087,993 B2 | 8/2006 | Lee | 257/728 |
| 7,129,568 B2 | 10/2006 | Lee et al. | 257/666 |
| 8,558,398 B1 | 10/2013 | Seetharam | 257/784 |

(Continued)

FOREIGN PATENT DOCUMENTS

| | | | | |
|---|---|---|---|---|
| EP | 0086305 A1 | * | 8/1983 | ........ G01M 11/3145 |
| WO | WO 2005111640 A1 | * | 11/2005 | ......... G01R 31/3187 |
| WO | WO 2014/012202 A1 | * | 1/2014 | ............ H04L 27/34 |

OTHER PUBLICATIONS

International Searching Authority, International Search Report—International Application No. PCT/US2017/042311, dated Oct. 30, 2017, together with the Written Opinion of the International Searching Authority, 9 pages.

(Continued)

*Primary Examiner* — Mamadou L Diallo
(74) *Attorney, Agent, or Firm* — Nutter McClellen & Fish LLP

(57) ABSTRACT

An active electronic steered antenna (AESA) circuit monitors bursts of a phased array that has a plurality of signal chains. Each signal chain therefore has a burst output for transmitting at least one burst. To monitor bursts, the AESA circuit has an input that is operably couplable with the burst output of at least one signal chain of the phased array. The input is configured to receive one or more bursts transmitted by the burst output(s) of the at least one signal chain. The AESA circuit also has a sample circuit operably coupled with the input and configured to sample the one or more bursts to produce one or more corresponding samples, and memory operably coupled with the sample circuit. The memory receives and stores the one or more samples. To provide access to the samples, the AESA circuit also has a memory interface.

16 Claims, 7 Drawing Sheets

(56) References Cited

U.S. PATENT DOCUMENTS

| | | |
|---|---|---|
| 8,866,283 B2 | 10/2014 | Chen et al. ............ H01L 24/06 |
| 2005/0017352 A1 | 1/2005 | Lee ............................... 257/728 |
| 2005/0082645 A1 | 4/2005 | Lee et al. ..................... 257/666 |
| 2005/0098860 A1 | 5/2005 | Lai et al. ...................... 257/666 |
| 2005/0130595 A1* | 6/2005 | Shurvinton et al. ......................... H03G 3/3047 455/67.11 |
| 2006/0006505 A1 | 1/2006 | Chiang et al. ................ 257/666 |
| 2008/0007453 A1* | 1/2008 | Vassilakis et al. ..... H01Q 1/246 342/368 |
| 2011/0198742 A1 | 8/2011 | Danno et al. ................. 257/676 |
| 2012/0039366 A1* | 2/2012 | Wood et al. .............. G01S 7/03 375/219 |
| 2012/0313219 A1 | 12/2012 | Chen et al. ................... 257/532 |
| 2016/0248157 A1 | 8/2016 | Rao et al. ............ H01Q 3/2694 |

OTHER PUBLICATIONS

Bailey, General Layout Guidelines for RF and Mixed-Signal PCBs, Maxim Integrated, Tutorial 5100, 10 pages, Sep. 14, 2011.
Ismail, Introduction to RF CMOS IC Design for Wireless Applications, Analog VLSI Lab, The Ohio State University, 117 pages, undated.
Jain, Layout Review Techniques for Low Power RF Designs, Application Note AN098, Texas Instruments, 14 pages, 2012.
Maxim, 5GHz, 4-Channel MIMO Transmitter, MAX2850, Maxim Integrated Products, Inc., 33 pages, 2010.
Silicon Labs, Layout Design Guide for the Si4455/435x RF ICs, AN685, Silicon Laboratories, 22 pages, 2014.

\* cited by examiner

PHASED ARRAY BURST SAMPLER

FIELD OF THE INVENTION

The invention generally relates to phased arrays and, more particularly, the invention relates to regulating bursts from phased arrays.

BACKGROUND OF THE INVENTION

Active electronically steered antenna systems ("AESA systems," a type of "phased array") form electronically steerable beams for a wide variety of radar and communications systems. To that end, AESA systems typically have a plurality of radiating elements that apply energy so that each radiating element can be coherently (i.e., in-phase and amplitude) combined in the antenna far field. Specifically, many AESA systems implement beam steering by providing a unique RF phase shift and gain setting (phase and gain together constitute a complex beam weight) between each radiating element and a beamforming or summation point.

During use, beams transmitted by some AESA systems unintentionally can be configured in a form that reduces their effectiveness and/or efficiency. Such sub-optimal beams can indicate an underlying problem with their underlying system, which should be addressed to restore preferred operation.

SUMMARY OF VARIOUS EMBODIMENTS

In accordance with one embodiment of the invention, an active electronic steered antenna (AESA) circuit monitors bursts of a phased array having a plurality of signal chains. Each signal chain therefore has a burst output for transmitting at least one burst. To monitor bursts, the AESA circuit has an input that is operably couplable with the burst output of at least one signal chain of the phased array. The input is configured to receive one or more bursts transmitted by the burst output(s) of the at least one signal chain. The AESA circuit also has a sample circuit operably coupled with the input and configured to sample the one or more bursts to produce one or more corresponding samples, and memory operably coupled with the sample circuit. The memory receives and stores the one or more samples. To provide access to the samples, the AESA circuit also has a memory interface.

The AESA circuit also may have a delay circuit operatively coupled with the sample circuit. Specifically, the delay circuit may be configured to select at least one sample point during a single period of each burst. Those sample points may be the same or different on different bursts. The sample circuit is configured to sample each burst at the sample point(s).

Some embodiments of the delay circuit are configured to select a plurality of sample points during a single period of each burst. For example, the delay circuit may be configured to select at least three sample points during the single period of each of the at least one burst. Those three (or more) sample points preferably are aperiodically spaced apart. Moreover, the AESA circuit also may have a control interface with programmable controls to program the sample point(s). For example, the control interface enables a user or logic to select the appropriate point(s) of the burst period for sampling.

Rather than using a synchronous device, such as a clock, the delay circuit preferably uses analog signaling to select the at least one sample point. For example, the delay circuit may include an integrator, which has a capacitor. The input, sample circuit, memory, and memory interface may be in a number of different forms, such as portions of a single integrated circuit.

As suggested above, the input may be operably coupled with a plurality of signal chains. In that case, the AESA circuit also may have a multiplexer to control receipt by the sample circuit of a plurality of bursts from the plurality of signal chains.

In accordance with another embodiment of the invention, a method monitors bursts of an active electronic steered array having a plurality of signal chains. In a manner with the above embodiment, each signal chain has a burst output for transmitting at least one burst. To monitor bursts, the method receives one or more bursts transmitted by the burst output(s) of the at least one signal chain, samples the one or more bursts to produce one or more samples, and stores the one or more samples in memory. The method also provides access to the one or more samples in memory.

In accordance with other embodiments of the invention, a phased array has a substrate, a plurality of elements on the substrate forming a patch array of an active electronically steered antenna system, and a plurality of signal chains electrically coupled with the plurality of elements. Each signal chain has a burst output coupled with one element in the patch array. Moreover, each burst output is configured to transmit at least one burst. The phased array also has a plurality of monitoring circuits on the substrate. Each monitoring circuit is coupled with at least one burst output in the patch array. In addition, each of the plurality of monitoring circuits has a sample circuit configured to sample one or more bursts to produce one or more samples. Each of the plurality of monitoring circuits also has memory for storing the one or more samples.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

To optimize system performance and/or diagnose systemic problems, illustrative embodiments selectively sample output transmission bursts of a plurality of transmission elements on an active electronically steered antenna system ("AESA system"). To that end, a programmable sample circuit selectively samples and stores selected transmission element burst power readings in memory for current or subsequent analysis. Details of illustrative embodiments are discussed below.

Figure 1:
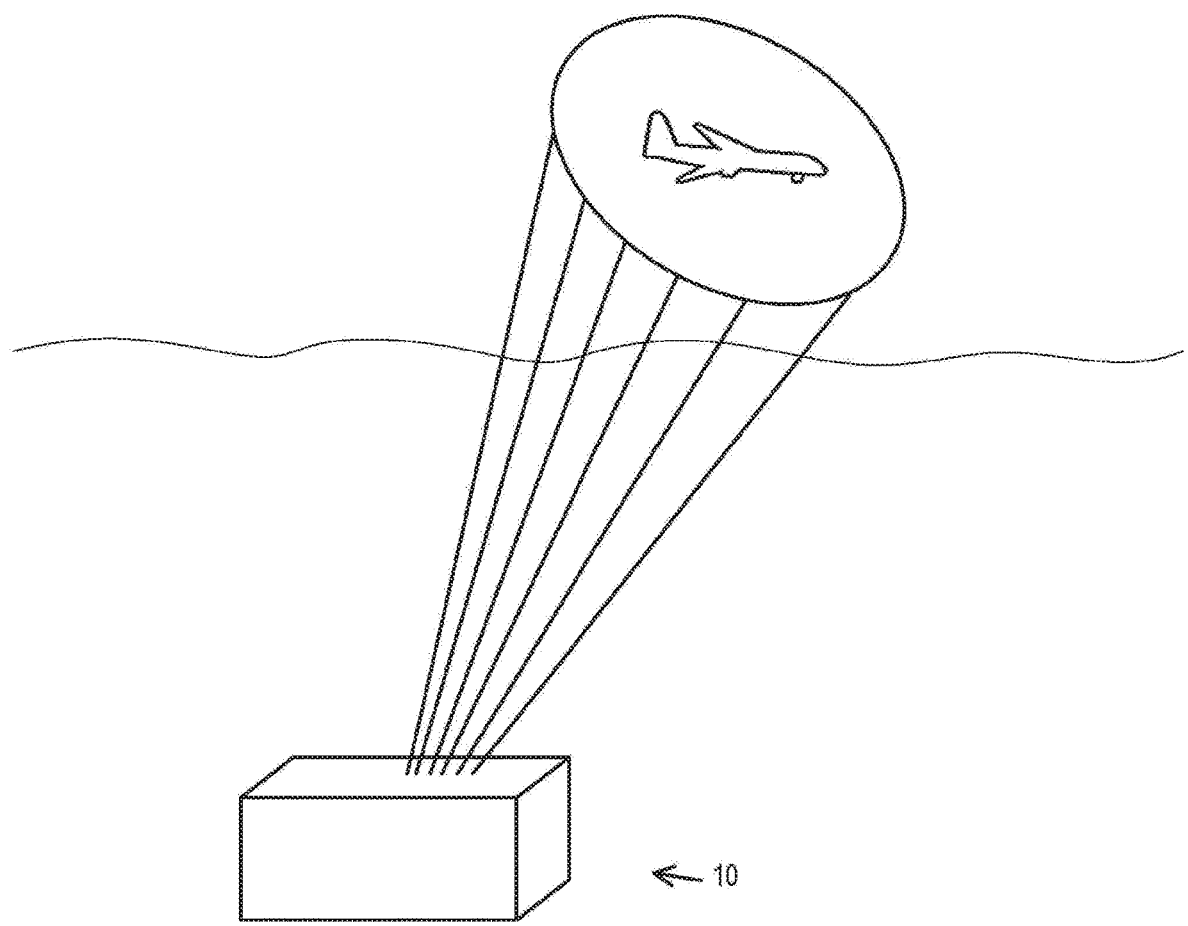
FIG. 1 schematically shows a phased array radar application that may be configured in accordance with illustrative embodiments of the invention.

FIG. 1 schematically shows one exemplary application of a phased array 10 that may be configured in accordance with illustrative embodiments of the invention. The phased array 10 implements the above noted AESA system (also identified by reference number "10"), which, as known by those skilled in the art, forms a plurality of electronically steerable beams that can be used for a wide variety of applications. The application in FIG. 1, for example, is implemented as a radar system that detects aircraft or other objects in the sky. Of course, those skilled in the art use AESA systems/phased arrays 10 in a wide variety of other applications, such as broadcasting, optics, etc. Accordingly, discussion of radar systems is not intended to limit all embodiments of the invention.

Figure 2:
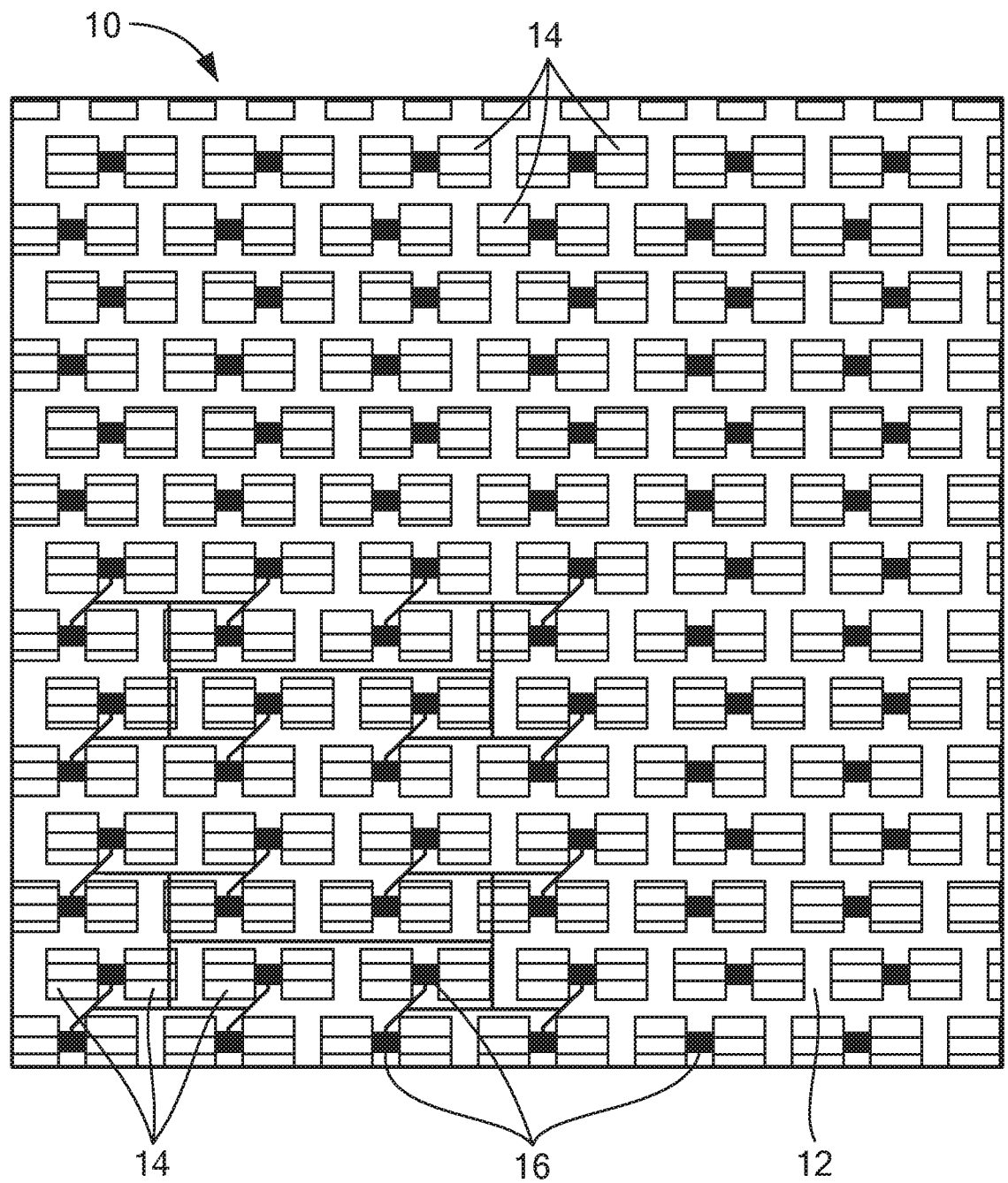
FIG. 2 schematically shows a plan view of a laminar phased array that may be configured in accordance with illustrative embodiments of the invention.

FIG. 2 schematically shows a plan view of a primary portion of an AESA system 10 that may be configured in accordance with illustrative embodiments of the invention. Specifically, the AESA system 10 of FIG. 2 is implemented as a laminar phased array having a printed circuit board 12 (i.e., a base or substrate) supporting a plurality of elements 14 (e.g., antennas). Specifically, the plurality of elements 14 preferably are formed as a plurality of patch antennas oriented in a triangular patch array configuration on the laminar printed circuit board 12. Indeed, this is a small phased array. Those skilled in the art can apply principles of illustrative embodiments to laminar phased arrays with hundreds, or even thousands of elements 14. In a similar manner, those skilled in the art can apply various embodiments to smaller phased arrays.

The AESA system 10 can have any of a variety of different types of elements 14. For example, the AESA system 10 can have transmit-only elements 14 and/or dual mode receive and transmit elements 14 (referred to as "dual-mode elements 14"). The transmit-only elements 14 are configured to transmit outgoing burst signals only. In contrast, the dual-mode elements 14 are configured to either transmit outgoing burst signals, or receive incoming signals, depending on the mode of the array 10 at the time of the operation. Specifically, when using dual-mode elements 14, the array 10 can be in either a transmit mode, or a receive mode. A controller 40, discussed below with regard to FIGS. 4 and 5, controls the mode and operation of the array 10 and other array functions.

The AESA system 10 has a plurality of integrated circuits 16 for controlling operation of the plurality of elements 14. Those skilled in the art often refer to these integrated circuits 16 as "beam steering integrated circuits." In illustrative embodiments, each integrated circuit 16 is configured with at least the minimum number of functions to accomplish the desired effect. Indeed, integrated circuits 16 for dual mode elements 14 are expected to have some different functionality than that of the integrated circuits 16 for the transmit-only elements 14. Accordingly, integrated circuits 16 for transmit elements 14 typically have a smaller footprint than the integrated circuits 16 that control the dual-mode elements 14.

As an example, depending on its role in the AESA system 10, each integrated circuit 16 may include some or all of the following functions:
 phase shifting,
 amplitude controlling/beam weighting,
 switching between transmit mode and receive mode,
 output amplification to amplify output signals to the elements 14,
 input amplification for received RF signals (e.g., signals received from a satellite), and
 power combining and splitting between elements 14.

Indeed, some embodiments of the integrated circuits 16 may have additional or different functionality, although illustrative embodiments are expected to operate satisfactorily with the above noted functions. Those skilled in the art can configure the integrated circuits 16 in any of a wide variety of manners to perform those functions. For example, the input amplification may be performed by a low noise amplifier, the phase shifting may use conventional phase shifters, and the switching functionality may be implemented using conventional transistor-based switches.

Each integrated circuit 16 preferably operates on at least one element 14 in the array. For example, one integrated circuit 16 can operate on four different elements 14. Of course, those skilled in the art can adjust the number of elements 14 sharing an integrated circuit 16 based upon the application. Sharing the integrated circuits 16 between multiple elements 14 in this manner reduces the required total number of integrated circuits 16, correspondingly reducing the required size of the printed circuit board 12.

RF interconnect and beam forming lines electrically connect the integrated circuits 16 to their respective elements 14. To minimize the feed loss, illustrative embodiments mount the integrated circuits 16 as close to their respective elements 14 as possible. To that end, each integrated circuit 16 preferably is packaged either with a flipped configuration using wafer level chip scale packaging (WLCSP), or a traditional package, such as quad flat no-leads package (QFN package).

It should be reiterated that although FIG. 2 shows the AESA system 10 with some specificity (e.g., the layout of the elements 14 and integrated circuits 16), those skilled in the art may apply illustrative embodiments to other implementations. Accordingly, discussion of the specific configuration of the AESA system 10 of FIG. 2 (and other figures) is for convenience only and not intended to limit all embodiments.

Figure 3:
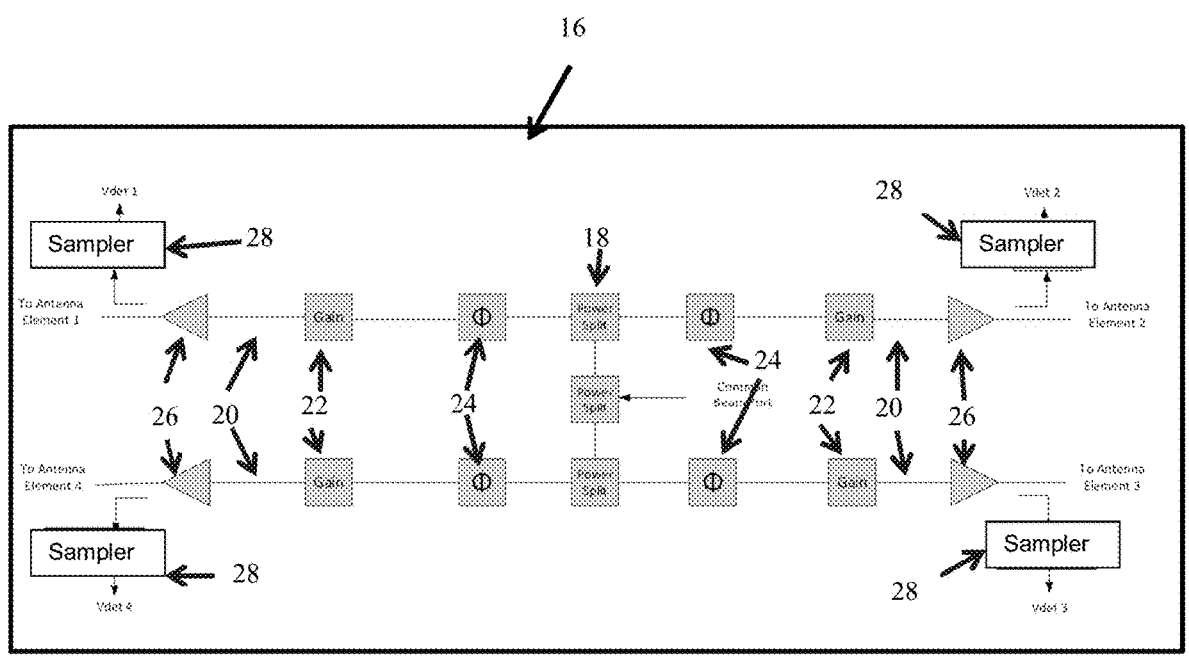
FIG. 3 schematically shows circuitry for controlling the laminar phased array of FIG. 2 in accordance with illustrative embodiments of the invention.

As noted above, illustrative embodiments share integrated circuits 16 between various elements 14. FIG. 3 schematically shows a functional block diagram of one integrated circuit 16 shared by four different elements 14. Specifically, this diagram shows a common power splitter 18 that divides received power between four separate channels 20. Each channel 20 forms the signal chain for managing beam transmission of one element 14. To that end, among other things, each channel 20 has a gain block 22 and a phase control block 24 for beam steering in the antenna far field, and an output amplifier 26 to drive its respective element 14. The output amplifier 26 electrically connects with the element 14 to transmit its burst signal.

In accordance with illustrative embodiments of the invention, each channel 20 also includes a sampling device (referred to generally as a "sampler 28," or an AESA circuit) that also is coupleable with the output of each channel 20.

Accordingly, the sampler 28 also receives the burst signal to be transmitted by its element 14. As discussed in greater detail below and noted above, this sampler 28 samples/senses aspects of transmitted bursts for a number of purposes. Specifically, output power sampling/sensing is useful to the AESA system 10 for at least two reasons: 1) telemetry and 2) control. From a telemetry perspective, the sampler 28 monitors the general health of the AESA system 10 so that maintenance may be coordinated if parts begin degrading or changing over time. In addition, the output of the sampler 28 can help identify parts within the AESA system 10 that require service. The sampler 28 and its related functionality thus act as proactive maintenance indicator, as well as a diagnostic tool for systemic maintenance.

From a control perspective, it is important to carefully sense and control the output power of the transmit function in the AESA system 10. For example, when a complex waveform is used, too much output power back-off (OBO) lowers the DC power efficiency of the transmit channel 20, while too little OBO reduces channel linearity and degrades waveform integrity. Careful control of OBO, however, can enable the system to optimize channel linearity vs. DC power efficiency. The sampler 28 enables such control.

Peak detection of the bursts can yield yet additional benefits. For example, careful sense and control of the transmit output power typically is important when the transmit channel 20 operates near its output compression point. Specifically, it is advantageous from a DC power efficiency perspective for the AESA system 10 to operate near or into compression. Undesirably, operating at this point can produce non-linearities and violate regulatory emissions requirements, such ACPR (Adjacent Channel Power Ratio) specifications. Careful sense and control of the output power can obviate this problem.

Figure 4:
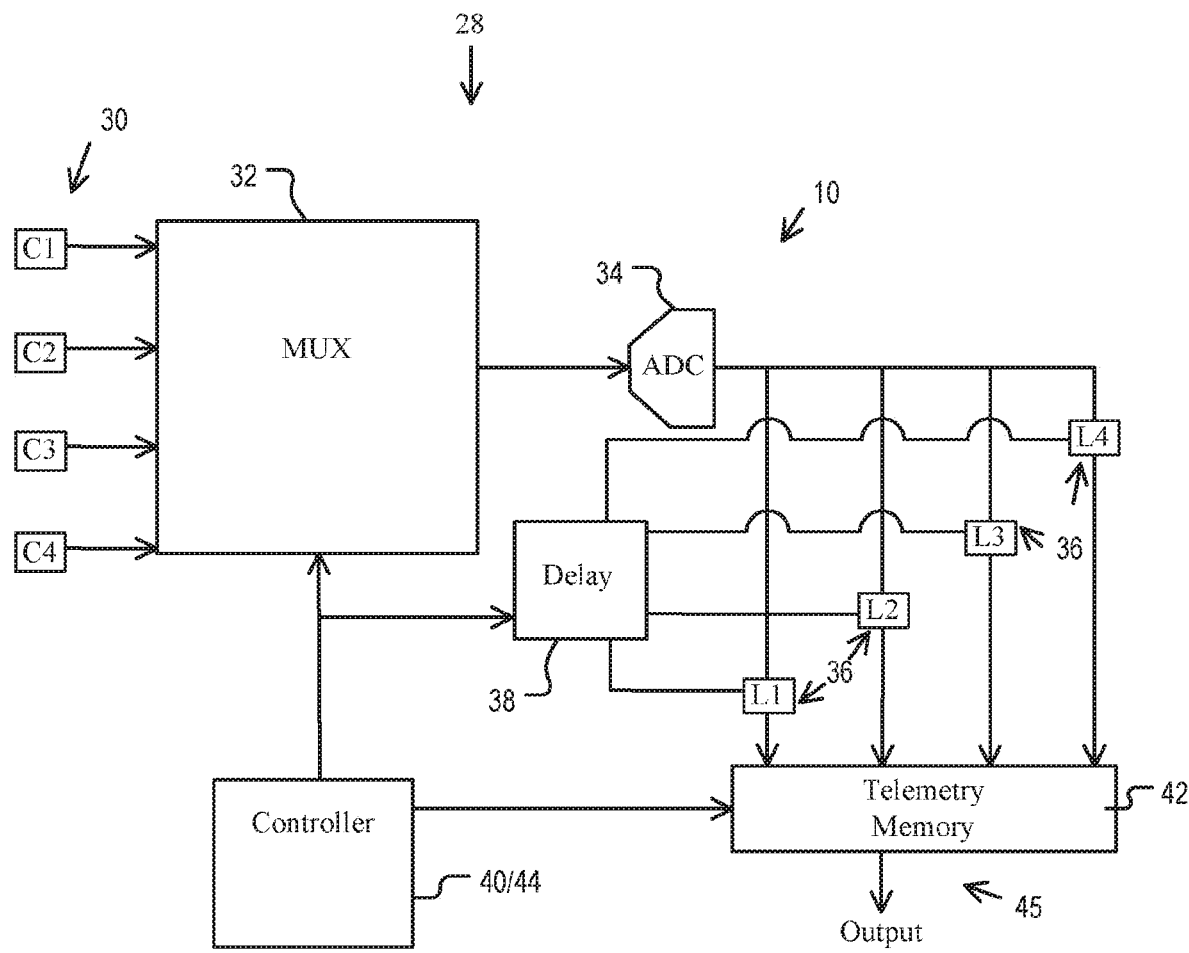
FIG. 4 schematically shows a generalized drawing of an active electronic steered antenna monitoring circuit that may be configured in accordance with illustrative embodiments of the invention.

To those ends, FIG. 4 schematically shows some details of the sampler 28, which also may be referred to as an "active electronic steered antenna monitoring circuit." In this embodiment, the sampler 28 has an input 30 for receiving the analog bursts signals from each channel 20. The drawing shows this input 30 as having the four respective burst signals from the four channels 20 shown in FIG. 3. To reduce device size, the sampler 28 has a multiplexor 32 that transmits the input analog bursts in a serial manner to a real-time, N-bit analog-to-digital converter 34. In illustrative embodiments, the analog-to-digital converter 34 is a real-time five-bit analog-to-digital converter 34, although it may produce larger or smaller digital words depending upon the application and other structure of the AESA system 10.

The output of the analog-to-digital converter 34 couples with four separate lines that each has a latch circuit 36. Each separate line preferably has a width that is equal to the width of the output word of the analog-to-digital converter 34. Accordingly, the embodiment using the five bit analog-to-digital converter 34 preferably has a line that is (at least) five bits wide. The latch circuits 36, which are digital memory devices such as simple flip-flops, temporarily and selectively store digital data they receive from the analog-to-digital converter 34 based upon a control signal.

Specifically, each latch circuit 36 stores a small number of samples, such as one sample, of some amplitude value/point of the digitized burst signal received from the analog-to-digital converter 34. In other words, each latch circuit 36 effectively stores one or more samples of a digitized burst signal. As phased signals, it is important to sample the digitized burst signals at the appropriate times. The sampler 28 therefore has a delay circuit 38 that controls when each latch circuit 36 samples its incoming burst signal.

The delay circuit 38 is configured to periodically or aperiodically enable each of the latch circuits 36 to selectively sample their respective burst signals. In preferred embodiments, the delay circuit 38 is programmable so that an operator may select one or more precise points (e.g., 1, 2, 3, 4 or more points) to sample over the period of a single burst. For example, a given latch circuit 36 may periodically sample the value at every 1.0 microsecond of a single four microsecond burst. In contrast, rather than being periodically enabled, the given latch circuit 36 may be aperiodically enabled by sampling a single four microsecond burst at the 1.0 microsecond point, the 1.2 microsecond point, and the 3.1 microsecond point. Other embodiments may simply enable the latch circuit 36 once per burst at a prescribed location. In yet other embodiments, a single channel 20 may sample different, serially received bursts at the same time, or at different times.

The prior noted controller 40 has a control interface 44 that enables the user to program the timing of the delay circuit 38 and thus, the latch circuits 36. In some embodiments, the control interface 44 is considered part of the overall sampler 28. Other embodiments, however, form the control interface 44 as another part of the integrated circuit 16. The user selects and enters the appropriate delay/timing of the delay circuit 38 based upon a number of factors, such as prior knowledge of system operation, the period/times of each of the bursts, etc.

The latches forward their sample values in a larger memory ("telemetry memory 42) for subsequent use. The control interface 44 may configure the telemetry memory 42 and selectively provide access to the stored sample data by another device (e.g., a remote device or coupled device) via a telemetry memory interface/output interface ("output 45").

Figure 5:
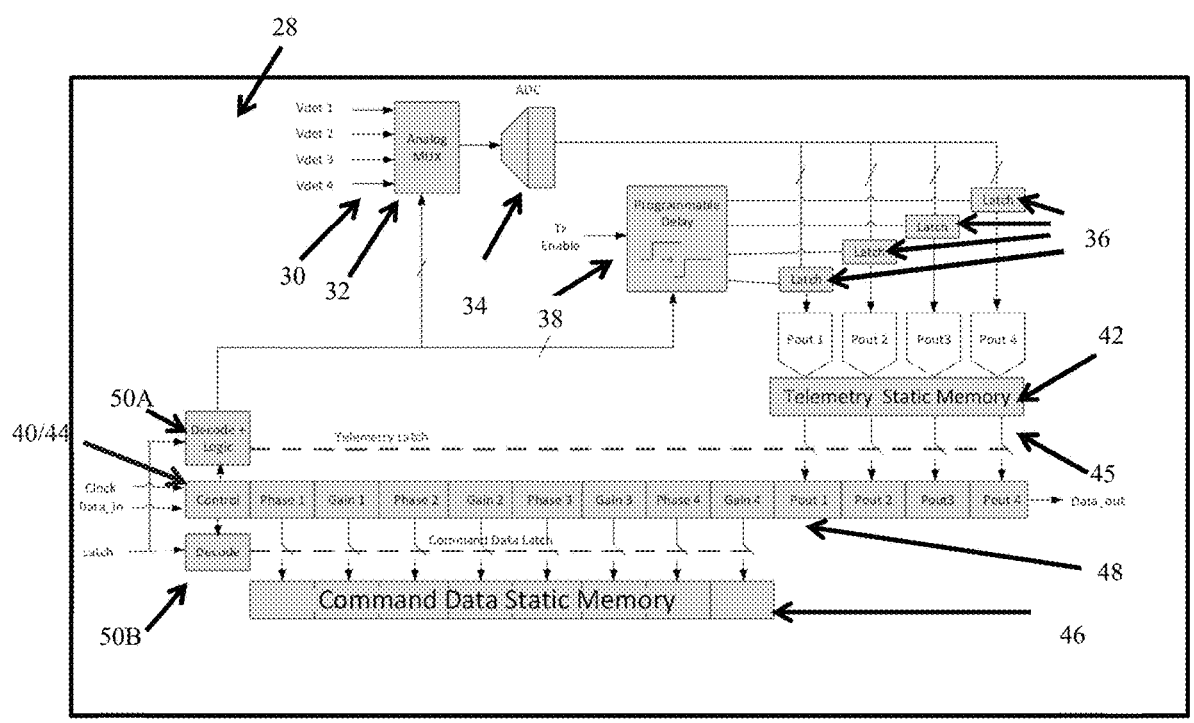
FIG. 5 schematically shows a more specific drawing of an active electronic steered antenna monitoring circuit that may be configured in accordance with illustrative embodiments of the invention.

FIG. 5 schematically shows additional details of the system of FIG. 4. Both figures have many common features, including the sampler input 30, the multiplexor 32, the analog-to-digital converter 34, the programmable delay circuit 38, the latch circuits 36, the telemetry memory 42, and the controller 40. FIG. 5, however, shows more details of the controller 40, which includes the control interface 44. This figure shows how the control interface 44 enables a user to enter specific beam steering configuration data, such as the requisite phase and gain of each channel 20. Specifically, the user enters that data into the control interface 44, which in this case includes a serial port interface 48, and stores that configuration data in static memory, such as a command data static memory 46.

The controller 40 also has decode logic 50A and 50B that controls various switches. Specifically, a first decode logic block 50A controls switches between the telemetry memory 42 and the serial port interface 48. Accordingly, sample data in the telemetry memory 42 may be retrieved through the output 45 via the serial port interface 48. A second decode logic block 50B controls switches that transfer input user configuration data, such as phase and gain of each channel 20, into the command data static memory 46.

FIG. 5 also shows output blocks ("Pout") from the latches into the telemetry memory 42, and switches before the latch circuits 36. Indeed, the specific configurations of FIGS. 4 and 5 are merely illustrative of one embodiment. For example, some embodiments may omit the multiplexor 32 and instead have structure to process all four channels 20 in parallel. Other embodiments may have an input and structure to process more or fewer than four input analog burst signals. Accordingly, those skilled in the art can use other configurations to accomplish various embodiments of the invention. Discussion of the implementations of FIGS. 4 and 5 thus are for illustrative purposes only and not intended to limit a number of other embodiments.

Those skilled in the art can use any of a wide variety of delay circuits. Illustrative embodiments, however, preferably avoid using so-called "clock circuits." Specifically, clock circuits known to the inventors generate repeating periodic signals, which undesirably may interfere with the underlying burst signals being transmitted. To that end, the delay circuit 38 preferably uses conventional analog signaling to mitigate that potential adverse effect.

Figure 6:
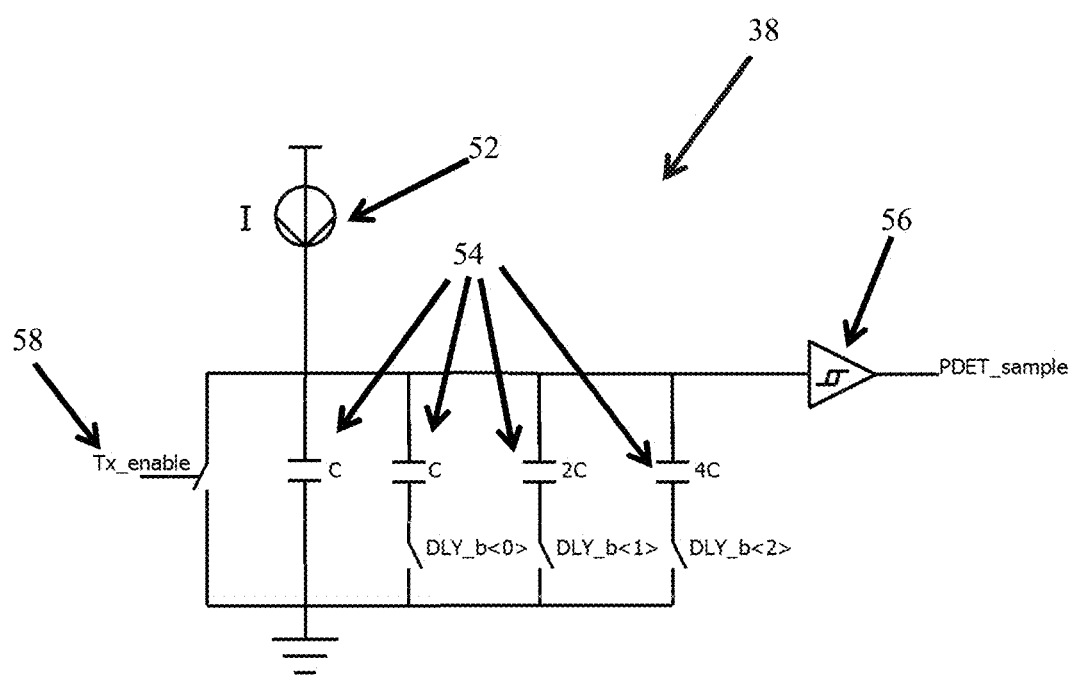
FIG. 6 schematically shows a programmable delay circuit of FIG. 5 configured in accordance with illustrative embodiments of the invention.

To that end, FIG. 6 schematically shows an implementation of the delay circuit 38 in accordance with illustrative embodiments of the invention. In this implementation, the delay circuit 38 is an integrator circuit, which integrates current flowing into a capacitance/capacitor. To that end, the delay circuit 38 has a current source 52 that feeds a plurality of parallel capacitors 54. As shown, one or more of the plurality of parallel capacitors 54 are implemented as switched capacitors 54 (i.e., each having one or more capacitors in series with a switch) and one or more are not switched capacitors 54. In this example, the capacitor 54 to the far left is not a switched capacitor.

Each of the capacitors 54 may have different capacitor sizes to provide different potential sample times for the latch circuits 36. In this implementation, the capacitors 54 are "binary weighted" so that each capacitor 54 having a switch is two times larger than the switched capacitor 54 to its immediate left. For example, the first switched capacitor 54 has a capacitance of C, the second switched capacitor 54 has a capacitance of 2C, and the third switch capacitor 54 has a capacitance of 4C. The capacitors 54 each are connected between the input of a digital threshold detector 56 and ground. Among other things, the digital threshold detector 56 may implement a Schmidt trigger, inverter, or simple comparator.

When disabled (i.e., when not sending a signal to the latch circuits 36 to sample), an enable switch 58 is closed, directing current from the current source 52 to ground. Accordingly, during that time, the capacitors 54 do not charge. When enabled, however, the enable switch 58 is open, causing current to flow through at least one of the capacitors 54. Specifically, as noted below, the user selects which capacitor(s) 54 should be in the overall capacitor circuit to provide the desired delay. Accordingly, in that case, the switched capacitor(s) 54, if selected, and the un-switched capacitor charge. The capacitor voltages preferably charge until they reach the threshold of the digital threshold detector 56. At that point, the output of the digital threshold detector 56 should switch from a low state (e.g., ground) to a high state (e.g. the supply voltage, or a logic one signal). As discussed below, this high state generates a signal that causes the latch circuit 36 to sample a digital burst input signal.

After reaching the threshold voltage, the enable switch 58 may close again, causing the capacitors 54 to discharge their accumulated voltage. Accordingly, when the capacitor voltages return below the threshold voltage of the digital threshold detector 56, the circuit produces a logical zero signal (e.g., ground). The total delay of the delay circuit 38 therefore may be controlled by increasing or decreasing the slope of the ramp signal produced by the charging capacitors 54. For example, including all of the switched capacitors 54 in the circuit increases the ramp time of the capacitor voltage(s) because the capacitors 54 require more time to charge. Illustrative embodiments also can vary the ramp time of the capacitor voltage(s) by adjusting the amplitude of the current source 52. Accordingly, the burst(s) are sampled as a function of the charging time of the capacitor(s) 54.

As noted, the AESA circuits of FIGS. 4 and 5 preferably are implemented as integrated circuits. For example, at least the input, latch circuits 36, telemetry memory 42, and telemetry memory interface/output may be formed as a single integrated circuit (e.g., an application specific integrated circuit—ASIC). The delay circuit 38 and other functional components also may be formed on the same integrated circuit.

Figure 7:
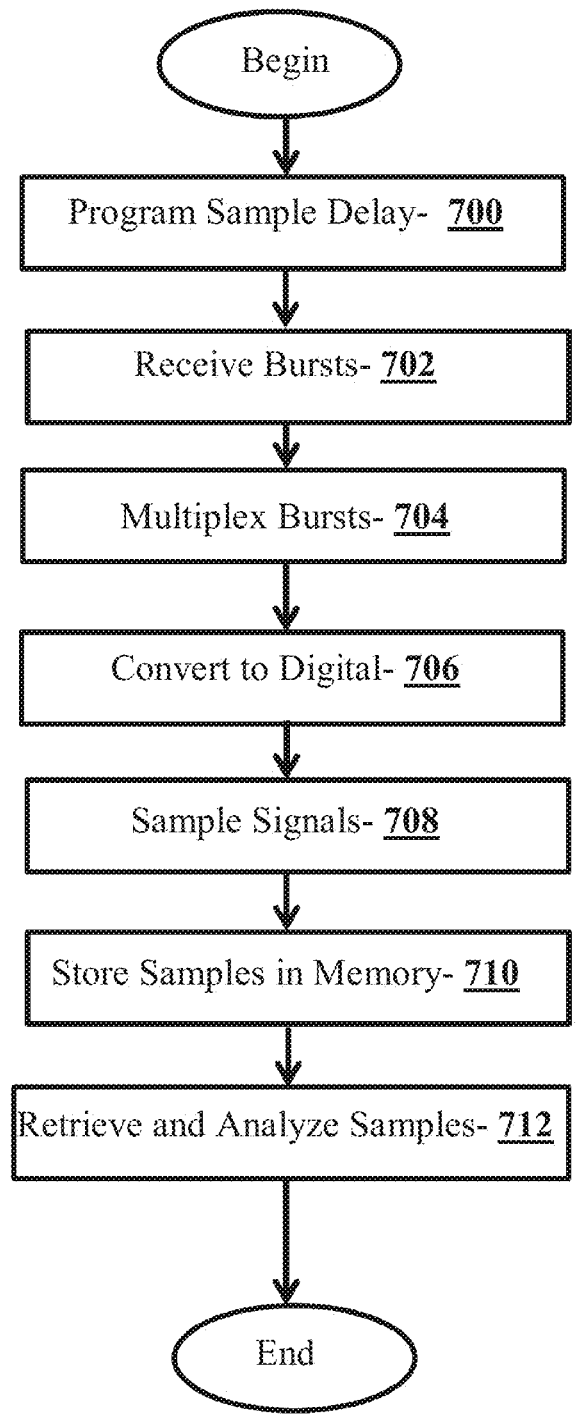
FIG. 7 shows a method of monitoring phased array bursts in accordance with illustrative embodiments of the invention.

FIG. 7 shows a method of monitoring phased array bursts in accordance with illustrative embodiments of the invention. It should be noted that this process is substantially simplified from a longer process that may be used to monitor bursts. Accordingly, the process may have additional steps that those skilled in the art may use. In addition, some of the steps may be performed in a different order than that shown, or at the same time. Those skilled in the art therefore can modify the process as appropriate. Moreover, as noted above and below, many of the discussed structures are but one of a wide variety of different structures that may be used. Those skilled in the art can select the appropriate structures depending upon the application and other constraints. Accordingly, discussion of specific structures is not intended to limit various embodiments.

The process of FIG. 7 begins at step 700, in which logic or a user programs the sample delay for the delay circuit 38. For example, because it multiplexes the burst signals, the delay circuit 38 of FIG. 5 causes the latch circuits 36 to sample the four different bursts at different times. Accordingly, using the specific implementation of FIG. 6, a user may program any one of eight delay values using three bits and a serial control register via the control interface 44. Each bit may control one of the switches of the three switched capacitors 54 of FIG. 6. As an example, the delay circuit 38 may be configured, based upon the switching, to have delays from between 250 nanoseconds to 20 microseconds.

Also during, before, or after step 700, logic or the user may program the desired phase and gain of each of the elements 14. In a manner similar to the delay circuit programming, the logic or user may enter these values via the control interface 44.

Next, step 702 receives bursts from the various elements 14. FIGS. 4 and 5 schematically show receipt of these bursts at the input 30 of the multiplexor 32, which multiplexes the bursts to the analog-to-digital converter 34 (step 704). The multiplexor 32 may multiplex portions of the bursts in a serial manner, or complete bursts. As its name suggests, the analog-to-digital converter 34 converts each received burst from analog format to digital format (step 706). Alternatively, as noted above, some embodiments may eliminate the multiplexor 32 and simply include one analog-to-digital converter 34 in each signal line—before the respective latch circuits 36. Accordingly, step 704 is optional.

Step 708 then samples the digitized burst signals. To that end, a switching array (FIG. 5) between the analog-to-digital converter 34 and the latch circuits 36 selectively couples multiplexed digital burst data with the appropriate latch circuit 36. Each latch circuit 36 consequently samples its respective input burst signal as dictated by the delay circuit 38. In embodiments using dual-mode elements 14, the delay circuit 38 may be enabled by a transition from the receive mode to the transmit mode. Accordingly, when transitioning to the transmit mode, the delay circuit 38 may start charging the capacitors 54 that are to be charged—for example, those capacitors 54 specified by the above noted 3 bit word. In embodiments using transmit-only elements 14, however, the delay circuit 38 may be enabled by some other stimulus.

Some embodiments may omit that noted switching array and instead rely on the timing of the delay circuit 38 to sample the appropriate digitized burst signals. This implementation thus generally relies upon sampling the different burst signals at different times. Those skilled in the art should understand, however, that other implementations may sample the different burst signals at the same time. In fact, as noted above, some embodiments sample a single burst multiple times within the same period/duration of the single burst.

Illustrative embodiments sample the bursts of each channel 20 in the same locations of each burst. For example, in the four channel system of FIGS. 4 and 5, the latch circuits 36 may sample each burst at the 1 microsecond point. Other embodiments, however, may sample the bursts of each channel 20 at different locations of each burst. For example, in the same four channel system of FIGS. 4 and 5, the latch circuits 36 may sample the first burst at least at the 0.5 millisecond point, the second burst at least at the 1.2 millisecond point, the third burst at least at the 1.3 millisecond point, and the fourth burst at least at the 1.9 millisecond point. Other embodiments may sample some at the same points and others at different points.

The process then continues to step 710, which stores the samples in the telemetry memory 42. FIG. 5 schematically shows an example of the samples being stored in the telemetry memory 42 based upon the channel 20 from which the data was received. Specifically, FIG. 5 shows specific blocks "Pout1," "Pout2," "Pout3," and "Pout4," which respectively store output for each of the four channels 20. The process concludes at step 712, and which the data is retrieved from the telemetry memory 42, via the telemetry memory interface/output 45, and subjected to analysis. For example, a device, such as a remote or local computer, may access retrieve the sample data from the telemetry memory 42 via this interface/output 45 via the serial port interface 48. Generally speaking, this step may determine at least one quality of at least one burst based on at least one of the samples in the telemetry memory 42. More specifically, the samples may be analyzed for any of a variety of qualities, such as one or both of telemetry and control. For example, the sample data can show that a burst in a variable-length burst AESA system 10 undesirably has "droop," which may signal the need to correct some portion of the overall AESA system 10.

Accordingly, unlike prior art devices known to the inventors, illustrative embodiments access specific samples of the burst signals, adding substantial value and benefit to the operation and functioning of the AESA system 10. Illustrative embodiments thus enable a host system to more easily monitor the health of the AESA system 10, identify failing components, and proactively schedule array maintenance.

Although the above discussion discloses various exemplary embodiments of the invention, it should be apparent that those skilled in the art can make various modifications that will achieve some of the advantages of the invention without departing from the true scope of the invention.

What is claimed is:

1. An active electronic steered antenna circuit for monitoring bursts of a phased array having a plurality of signal chains, each signal chain having a burst output for transmitting at least one burst, the circuit comprising:
an input operably couplable with the burst output of at least one signal chain of the phased array, the input being configured to receive one or more bursts transmitted by the burst output(s) of the at least one signal chain;
a sample circuit operably coupled with the input, the sample circuit being configured to sample the one or more bursts to produce one or more samples;
memory operably coupled with the sample circuit, the memory receiving and storing the one or more of samples; and
a memory interface configured to provide access to the one or more samples.

2. The active electronic steered antenna circuit as defined by claim 1 further comprising a delay circuit operatively coupled with the sample circuit, the at least one burst having a period, the delay circuit being configured to select at least one sample point during a single period of each of the at least one burst, the sample circuit being configured to sample the at least one burst at the at least one sample point.

3. The active electronic steered antenna circuit as defined by claim 2 wherein the delay circuit is configured to select a plurality of sample points during a single period of each of the at least one burst.

4. The active electronic steered antenna circuit as defined by claim 3 wherein the delay circuit is configured to select at least three sample points during the single period of each of the at least one burst, the at least three sample points being aperiodically spaced apart.

5. The active electronic steered antenna circuit as defined by claim 2 further comprising a control interface operatively coupled with the delay circuit, the control interface having programmable controls to program the at least one sample point.

6. The active electronic steered antenna circuit as defined by claim 1 wherein the delay circuit comprises analog signaling to select at least one sample point.

7. The active electronic steered antenna circuit as defined by claim 1 wherein the delay circuit comprises an integrator.

8. The active electronic steered antenna circuit as defined by claim 1 wherein the input, sample circuit, memory, and memory interface are formed as a single integrated circuit.

9. The active electronic steered antenna circuit as defined by claim 1 wherein the input is operably coupled with a plurality of signal chains, the circuit further having a multiplexer to control receipt by the sample circuit of a plurality of bursts from the plurality of signal chains.

10. A method of monitoring bursts of an active electronic steered array having a plurality of signal chains, each signal chain having a burst output for transmitting at least one burst, the method comprising:
receiving one or more bursts transmitted by the burst output(s) of the at least one signal chain;
sampling the one or more bursts to produce one or more samples;
storing the one or more samples in memory; and
providing access to the one or more samples in memory.

11. The method as defined by claim 10 further comprising accessing the one or more samples in memory, and determining at least one quality of at least one burst based on at least one of the samples in memory.

12. The method as defined by claim 10 wherein the at least one burst has a period, the method further comprising selecting at least one sample point during a single period of each of the at least one burst, and sampling the at least one burst at the at least one sample point.

13. The method as defined by claim 12 further comprising selecting a plurality of sample points during a single period of one of the bursts.

14. The method as defined by claim 13 further comprising selecting at least three sample points during the single period of each of the at least one burst, the at least three sample points being aperiodically spaced apart.

15. The method as defined by claim 12 wherein selecting comprises charging a capacitor in response to a trigger, the method selecting the at least one sampling point as a function of the charging of the capacitor.

16. The method as defined by claim 12 further comprising programming, via a control interface, the location of at least one sample point.

* * * * *